United States Statutory Invention Registration [19]

[11] Reg. Number: H806

Keifer et al. [43] Published: Aug. 7, 1990

[54] HERBICIDAL CLOMAZONE COMPOSITIONS AND METHODS OF USE TOLERANT TO CORN AND OTHER CROPS

[75] Inventors: David W. Keifer, Skillman; John M. Tymonko, Hamilton Square; Earl D. Felix, Trenton; William A. Van Saun, Titusville, all of N.J.

[73] Assignee: FMC Corporation, Philadelphia, Pa.

[21] Appl. No.: 74,383

[22] Filed: Jul. 16, 1987

[51] Int. Cl.[5] ..... A01N 43/00
[52] U.S. Cl. ..... 71/88
[58] Field of Search ..... 71/88

[56] References Cited

U.S. PATENT DOCUMENTS

| | | | |
|---|---|---|---|
| 3,564,768 | 2/1971 | Hoffman | 71/88 |
| 4,343,649 | 8/1982 | Sweetser | 71/88 |
| 4,405,357 | 9/1983 | Chang | 71/88 |
| 4,692,182 | 9/1987 | Chang | 71/88 |

OTHER PUBLICATIONS

Parker, C., "Herbicide Antidotes–A Review" Pesticide Science 1983, 14, pp. 40–48.

*Primary Examiner*—Matthew A. Thexton
*Assistant Examiner*—Richard Treanor
*Attorney, Agent, or Firm*—Beverly K. Johnson; Patrick C. Baker; H. Robinson Ertelt

[57] ABSTRACT

Synergistic herbicidal effect is obtained in the application of clomazone together with reduction in the rate of clomazone, by combining clomazone with a photosystem II (PS-II) inhibiting herbicide such as atrazine, cyanazine or linuron. Crops such as corn and other gramineous plants are rendered more tolerant to clomazone and to combinations of clomazone with a PS-II inhibiting herbicide by treatment of the crops or crop seeds with a safener such as 1,8-naphthalic anhydride.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HERBICIDAL CLOMAZONE COMPOSITIONS AND METHODS OF USE TOLERANT TO CORN AND OTHER CROPS

TECHNICAL FIELD

This invention relates to the control of undesirable vegetation encountered in the cultivation of various plant species, particularly agronomic gramineous crops.

BACKGROUND OF THE INVENTION

The compound 2-[(2-chlorophenyl)methyl]-4,4-dimethyl-3-isoxazolidinone, hereinafter referred to by the common name "clomazone", is a potent herbicide as evidenced by its ability to control, for full growing seasons and at low application rates in soybean stands, a broad spectrum of grasses and broadleaf weeds that compete with soybeans. As with many herbicides, however, clomazone is not as quickly metabolized by some crops, trees and ornamentals as it is by soybeans. Such intolerance can result temporarily in unsightly yellowing or whitening of the plants unless precautions are taken to prevent or minimize exposure. These precautions include control of surface spraying to forestall drift to adjacent fields planted with low tolerance crops, incorporation into soil during tillage to avoid volatilization due to high temperature and/or moisture, rotation to sensitive crops after specified periods of time following application of clomazone, and thorough cleaning of spray tanks to avoid contaminating other chemicals.

Although good agronomy dictates use of one or more of the foregoing practices at all times, it will be evident that measures that will permit reduction in rates of application of clomazone or which otherwise will increase the tolerance of desirable plants to clomazone without substantial diminution of herbicidal efficacy against weeds, will greatly expand the usefulness of clomazone and ultimately result in lower cost. For example, because corn is sensitive to clomazone, clomazone cannot be used to combat weeds in corn stands. To prevent carryover, fields treated with clomazone cannot be rotated to corn for at least nine months after application of clomazone. Other gramineous crops are similarly disadvantaged.

In this specification the term "crops" includes not only agronomic crops but plants of all kinds, and the term "gramineous" includes both cereal and non-cereal grassy crops, such as corn, wheat, oats, barley, rice, cotton, sorghum and sugar cane.

SUMMARY OF THE INVENTION

It has now been found, in one aspect of the invention, that by combining clomazone treatment and treatment with one or more photosystem II (hereafter abbreviated "PS-II") inhibiting herbicides, the rate of clomazone application may be substantially reduced without loss of herbicidal activity, accompanied by substantially improved tolerance towards gramineous crops heretofore damaged by clomazone, such as corn. The discovery thereby opens up applicability of clomazone to control of weeds in crops other than soybeans, such as corn, sorghum, sugar cane, barley, wheat, oats, cotton, lima beans and other gramineous crops.

In another aspect of the invention, the protection of corn and other gramineous crops is maximized by treatment with a safener prior to exposure to clomazone alone or with a PS-II inhibiting herbicide.

In still another aspect, specific PS-II inhibiting herbicides, selected from one or more of triazine and urea herbicides, including mixtures thereof, are synergistically combined with clomazone either by admixture prior to application, or by separate application. Both clomazone and the co-herbicide, when combined, thereby become effective at lower rates of application for weed control in a variety of crops including gramineous crops such as corn.

DETAILED DESCRIPTION

Figure 1:
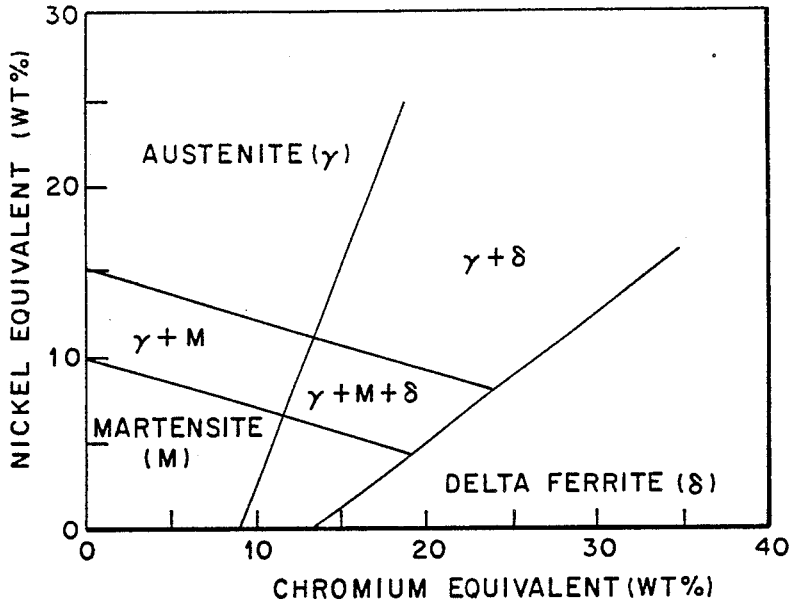
Figure 2:
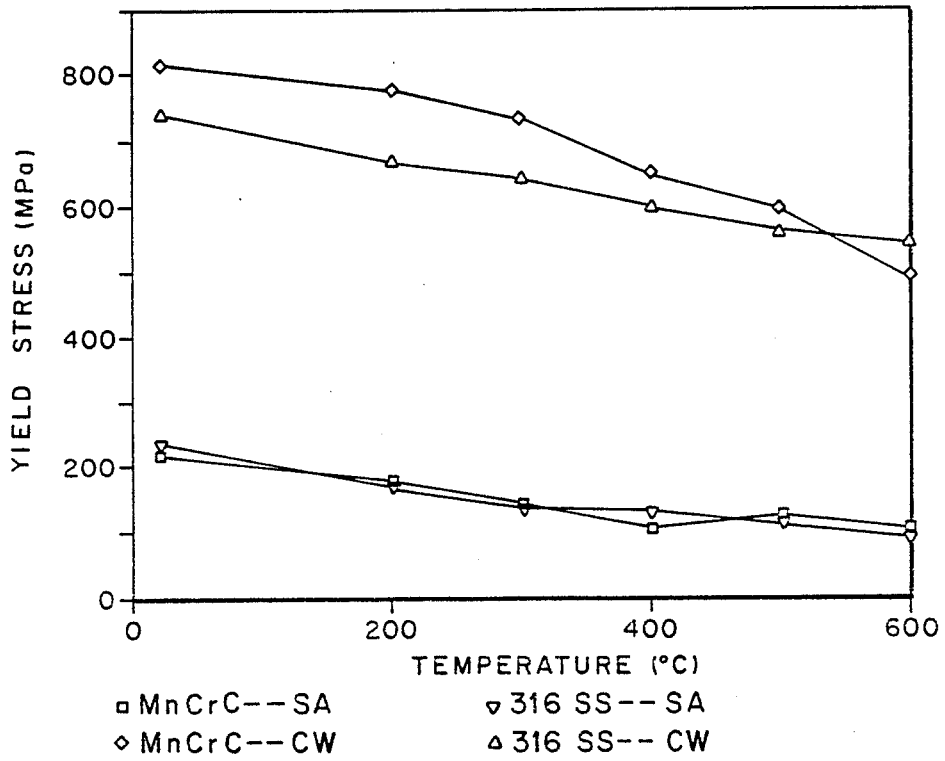
Figure 3:
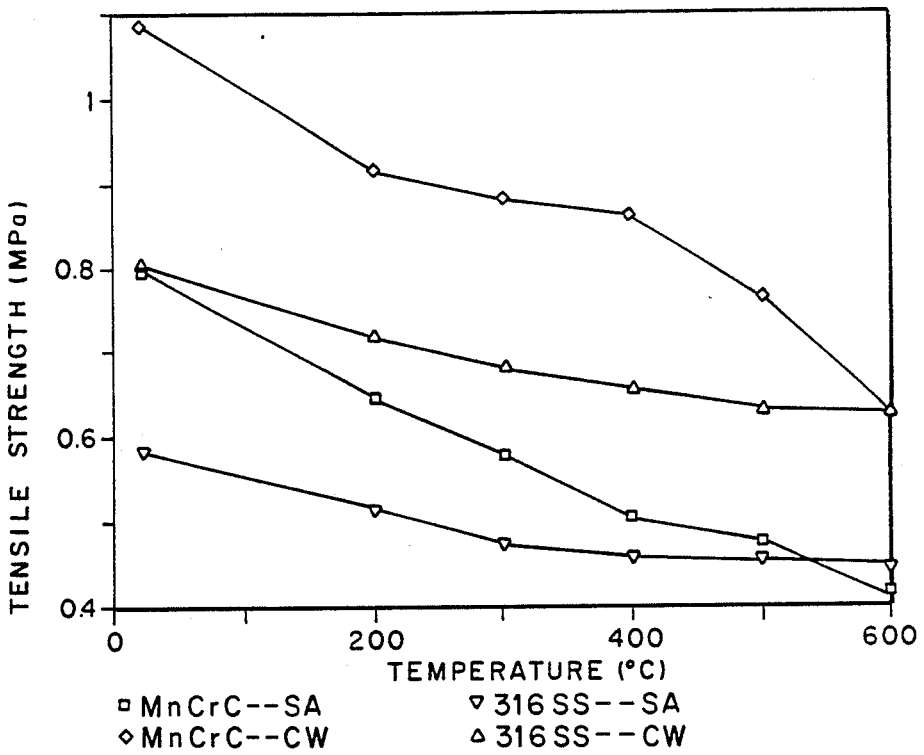
Figure 4:
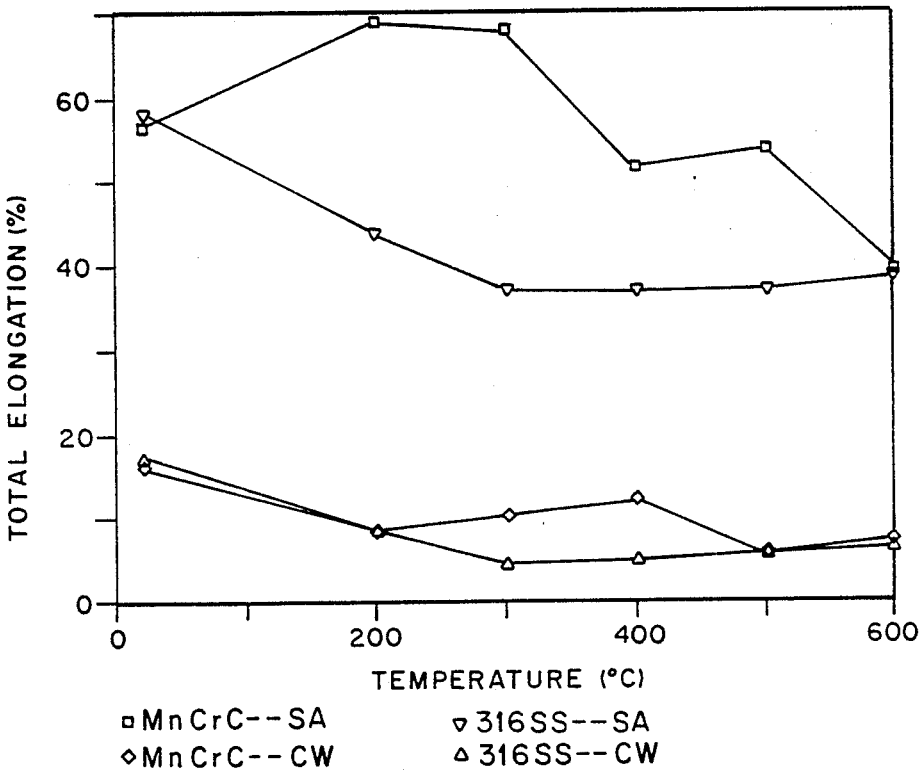
Figure 5:
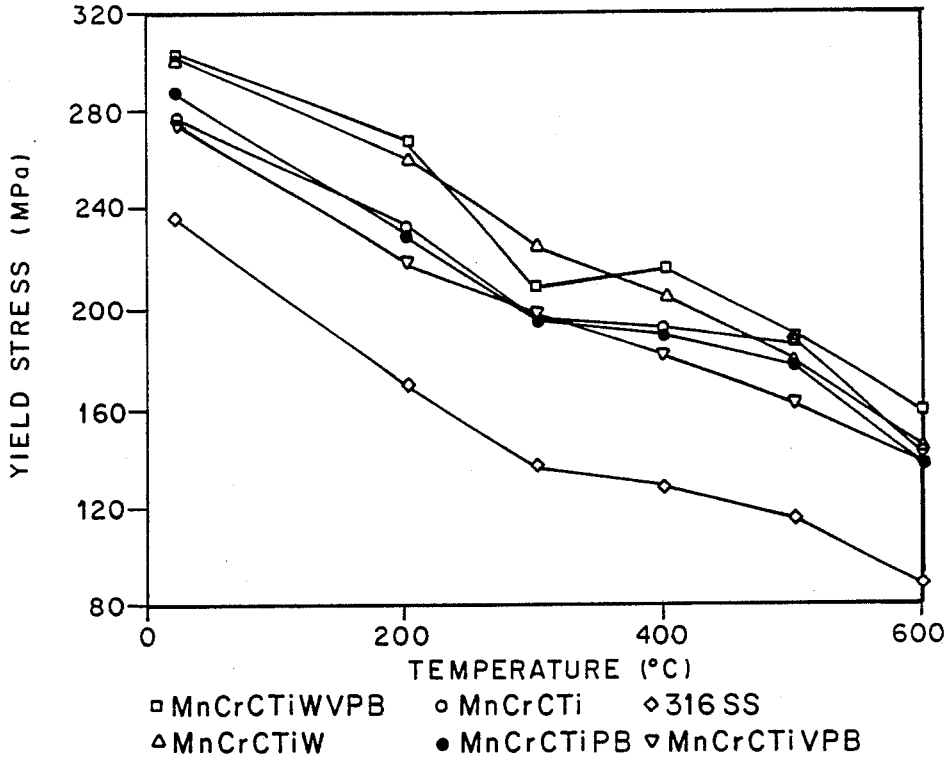
Figure 6:
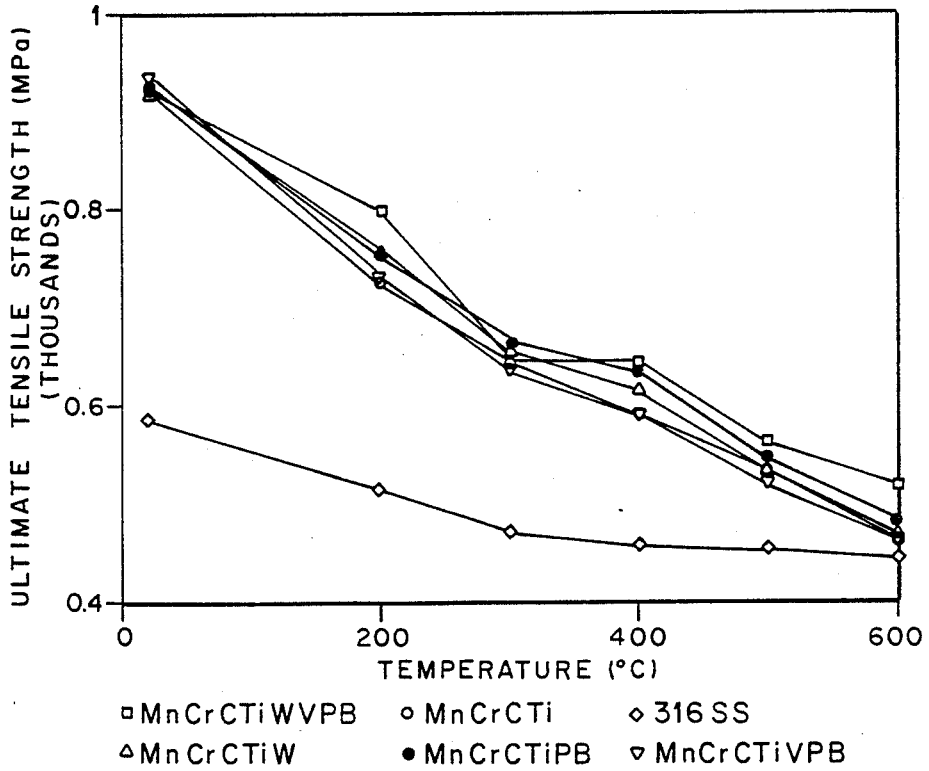
Figure 7:
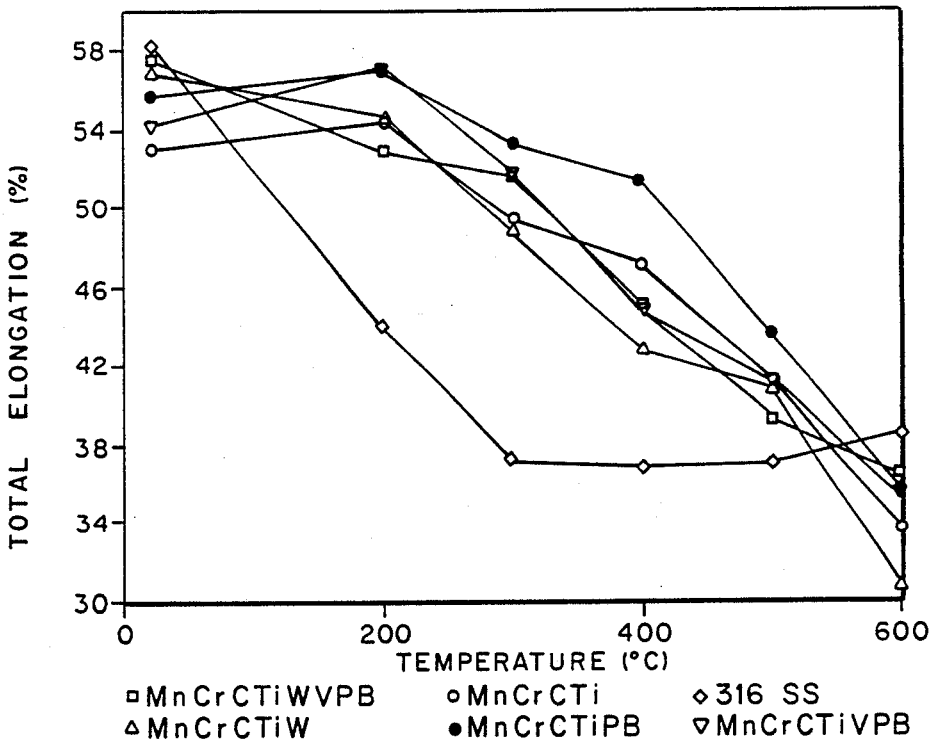
Figure 8:
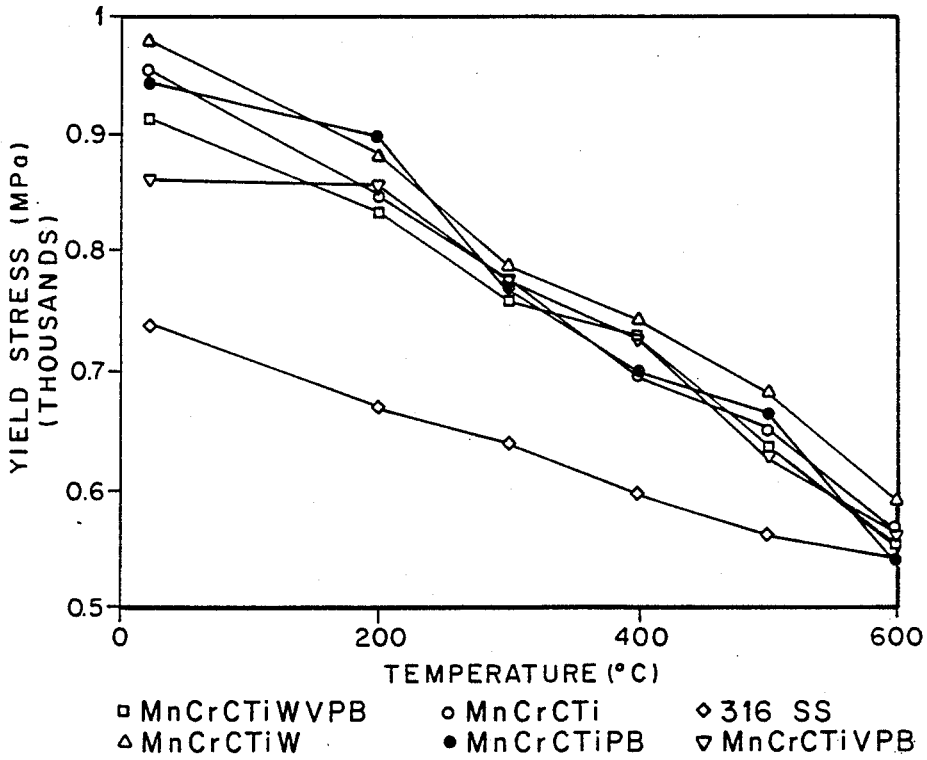
Figure 9:
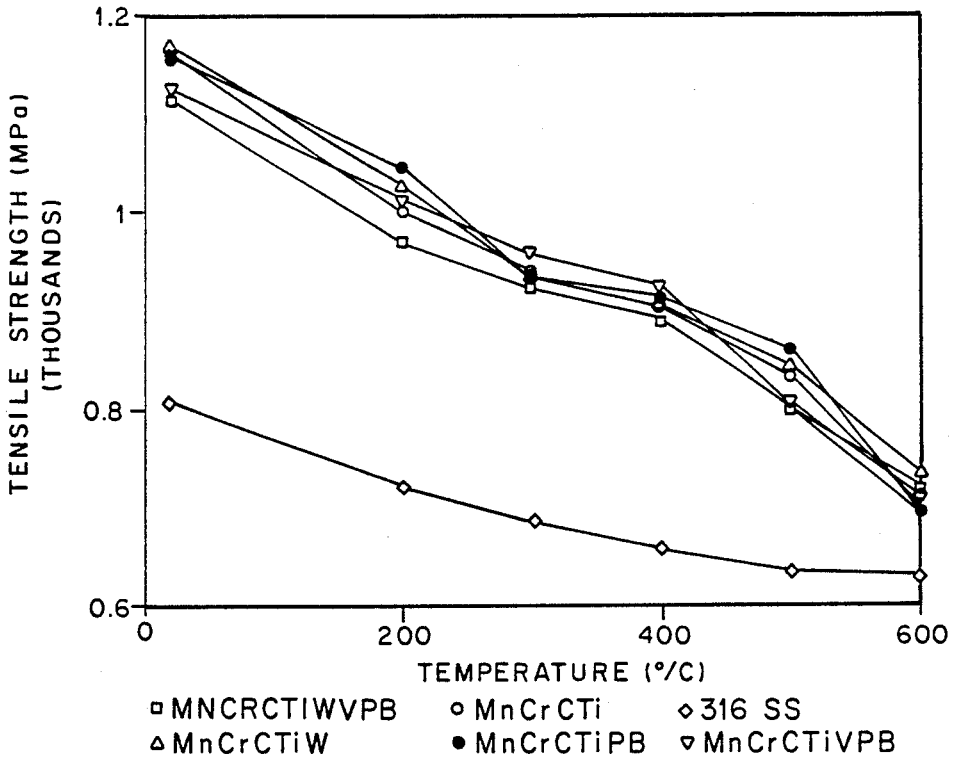
Figure 10:
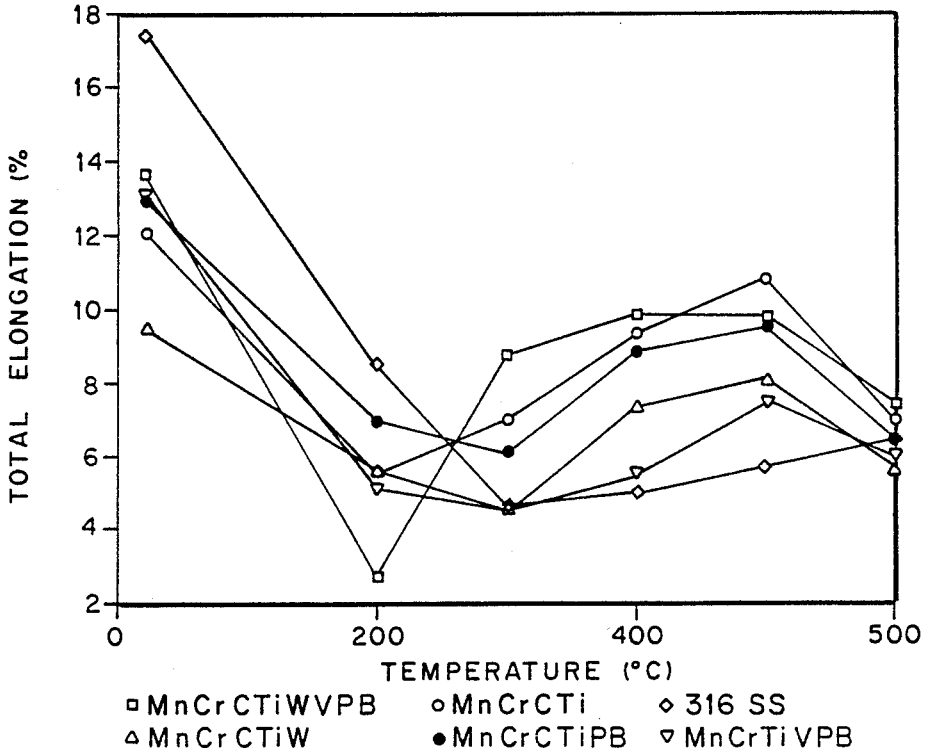

Clomazone is described in U.S. Pat. No. 4,405,357 issued Sept. 30, 1983 to J. H. Chang, specifically Example 16 thereof. PS-II inhibiting herbicides are a well known class of herbicides characterized by ability to inhibit the conversion of light energy into chemical energy during the process of photosynthesis in the chloroplast. This inhibiting action has also been described as the blocking of electron transport in the photosystem II pathway to photosynthesis. Herbicidal activity of the PS-II inhibiting type is in contrast to herbicidal action characterized by direct or indirect interference with synthesis of the carotenoid protectants of chlorophyll. Herbicides which operate by the latter mechanism are also known as "bleaching herbicides". PS-II inhibiting herbicides and the bleaching herbicides are discussed and described in various publications including C. Feldtke, Biochemistry and Physiology of Herbicide Action, Springer-Verlag (New York 1982), 202 pages, particularly pages 18–51 and 99–111. The latter text is incorporated herein by reference.

Unlike the well-known bleaching herbicides, clomazone is, in addition to being a bleaching herbicide, an inhibitor of the synthesis of chlorophyll.

As apparent from the Feldtke text, pages 18–51, PSII inhibiting herbicides include the following classes of compounds: ureas, anilides, s-triazines, as-triazinones, uracils, biscarbamates, pyridazinones, hydroxybenzonitriles, nitrophenols, benzimidazoles, quinoids, and miscellaneous compounds not classifiable by structure. All of these compounds are believed to be useful as co-herbicides with clomazone in the present invention. Of the PS-II inhibitors the triazines and ureas are preferred to date, as represented by cyanazine, atrazine and linuron.

The PS-II inhibiting herbicide and clomazone are formulated and applied in accordance with procedures standard in herbicidal treatments as modified by the labels established for each of the active ingredients and by the discoveries of the present invention. Generally, the herbicides are applied in dilute form with an agriculturally acceptable, relatively inert, solid or liquid carrier. Since, as is well known, the formulation and mode of application of a herbicide may affect activity in a given application, the herbicides may be formulated separately or in admixture as emulsifiable concentrates (EC's), as granules preferably of relatively large particle size, as wettable powders, as solutions or suspensions, or in other forms.

To obtain the benefits of the invention, the amount of the PS-II inhibiting herbicide will be in excess of the amount of clomazone, on the order of two to three times by weight as much, or more, of the PS-II inhibiting herbicide as clomazone. Optimum ratios are routinely determined for the particular PS-II inhibiting herbicide selected for combination with clomazone. For example, it has been found that in the case of atrazine, the ratio of atrazine to clomazone should be at least about 2:1 by weight but may range as high as about 15:1 by weight or more. Keeping in mind such ratios, the herbicides may be formulated singly or in admixture to contain between about 0.01% and 95% by weight active ingredient, the balance being a carrier (one or more) together, in some formulations, with a surface active agent. Typically, the carrier will comprise about 4–98% by weight of the formulation and a surface active agent about 1–15% by weight.

Emulsifiable concentrates are homogeneous liquid or paste compositions dispersible in water or other dispersant, and may consist entirely of a compound of this invention with a liquid or solid emulsifying agent, or may also contain an agriculturally acceptable liquid carrier, such as xylene, heavy aromatic naphthas, isophorone and other non-volatile and other non-volatile organic solvents. For example, a useful emulsifiable concentrate formulation, designated "4EC' because it contains four pounds of active ingredient per gallon of concentrate (0.479 kg/liter), contains 53.01 parts of clomazone, 6.0 parts of a blend of alkylnaphthalenesulfonate and polyoxyethylene ethers and emulsifiers, 1.0 part of epoxidized soybean oil as stabilizer, and as solvent 39.99 parts of petroleum distillate having a high flash-point.

Granular formulations are particularly useful for aerial distribution. Useful granular formulations may be of several types. Impregnated granules are those wherein the active ingredient is applied to large particles of an absorbent carrier, such as an attapulgite or kaolin clay, corncobs, expanded mica, normally in the form of a solution in a solvent. Surface-coated granules may be produced by spraying the molten active ingredient onto the surface of a generally nonabsorbent particle or by spraying on a solution of active ingredient in a solvent. The core may be water-soluble such as sand, marble chips or coarse talc. Particularly useful is a granule wherein a wettable powder is applied as a surface coating to a sand or other insoluble particle such that the wettable powder may be dispersed on contact of the granule with moisture. Granules may be produced by agglomeration of dusts or powders by compaction rollers, by extrusion through a die or by use of a granulating disc. Granular formulations may vary widely in concentration, with useful formulations containing as little as 0.5% or as much as 95% of active ingredient.

Wettable powders, also useful formulations for preemergence herbicides, are in the form of finely divided particles which disperse readily in water or other dispersants. The wettable powder is ultimately applied to the soil as a finely divided dry material or as an emulsion in water or other liquid. Typical carriers for wettable powders include fuller's earth, kaolin clays, silicas and other highly absorbent, readily wet inorganic diluents. Wettable powders normally are prepared to contain about 5% to 80% of active ingredient, depending on the absorbability of the active ingredient and on the absorbency of the carrier, and usually also contain a small amount of a wetting, dispersing or emulsifying agent to facilitate dispersion.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface active agents, many of which are available commerce.

As indicated, the PS-II inhibiting herbicide may be incorporated into the same formulation with clomazone or may be separately formulated in the same manner as clomazone.

The formulations may be applied without further dilution or as dilute solutions, emulsions or suspensions in water or other suitable diluent. The compositions may be applied to the area wherein control is desired, prior to emergence in the case of agronomic gramineous to crops, by spraying onto the surface of the soil in the case of liquid compositions or by distribution from mechanical equipment in the case of solids. It may be preferable to blend clomazone formulation into the upper layer of soil by cultivation.

The active herbicidal compounds of the invention may be formulated and/or applied with insecticides, fungicides, nematicides, plant growth regulators, fertilizers, and other agricultural chemicals. In applying the active compounds of this invention, whether formulated alone or with other agricultural chemicals, an effective amount of each active ingredient is employed. The amount constituting an effective amount is variable, depending on the ratio of PS-II inhibiting herbicide to clomazone and other factors such as the type of soil, the expected pattern of rainfall or irrigation, the plant species to be controlled, and the gramineous crop, if any, to be grown. Generally, a uniform application of from about 0.01 to about 0.5 kilograms per hectare of clomazone will be employed, more preferably, from 0.06 to 0.4 kilograms per hectare. The PS-II inhibiting herbicide rate of application in the case of atrazine may range from about 0.04 to about 2.0 kilograms per hectare, more preferably about 0.3 to 1.5 kilograms per hectare. The same or other rates may be used for other PS-II inhibiting herbicides. Generally, the rate of application in the field will be about 2 to 4 times that in the greenhouse.

Crops protected by appropriate rates of application of the combined treatment include gramineous crops such as sorghum, sugar cane, and corn (field, sweet, popcorn). Protection is further enhanced, particularly in the case of certain corn hybrids or other desirable plants sensitive to clomazone, by application of a safener (also known as an antidote). A safener effective for this purpose is 1,8-naphthalic anhydride (hereafter sometimes abbreviated as "NA"). Other safeners are described in the literature such as K.K. Hatzios, Herbicide Antidotes: Development, Chemistry, and Mode of Action, Advances In Agronomy, vol. 36, 265–315, Academic Press, 1983; and C. Parker, Herbicide Antidotes—A Review, Pestic. Sci., 14,440–48 (1983). These articles are incorporated herein by reference. The safener is applied in the same manner as a herbicide, i.e., formulated as an emulsifiable concentrate, wettable powder, granules, suspension or a solution. The safener may be applied as a coating to crop seed or seed of other desirable plants, preemergently to the locus of a plant to be protected or, in some cases, to the plant itself. Preferably, the safener is applied prior to exposure to clomazone. Safening amounts will vary according to the gramineous plant to be protected, soil conditions, and the rate of application of clomazone. For corn seed, about 0.05% to 1.5% by weight, preferably about 0.1% to 0.5% by weight, on weight of seed is effective.

Herbicidal Evaluation

The herbicidal compositions of the invention were evaluated in a laboratory greenhouse as described below. Atrazine was evaluated as a representative PS-II inhibiting herbicide. In a first series of tests (Series A, Tables 1 and 2) the tolerance to clomazone of various crops was studied relative to treatment with 1,8-naphthalic anhydride. In a second series of tests (Series B, Tables 3, 3A and 4) the effect of combined treatments with clomazone and atrazine was studied, again relative to protection with 1,8-naphthalic anhydride.

The formulations in the Series B tests were as follows where the clomazone formulation was a 4.0 lb/gal emulsifiable concentrate (identified below as "4 EC") and the atrazine formulation was an 80% wettable powder (identified as "80 WP").

| | % wt/wt |
|---|---|
| Clomazone (88.9% technical) | 52.40 |
| Emulsifier A | 5.60 |
| Emulsifier B | 1.40 |
| Carrier/diluent | 40.60 |

Emulsifier A is a blend of the anionic calcium salt of dodecyl benzene sulfonate and a nonionic 30 molar ethylene oxide condensation product of nonylphenol. Emulsifier B is a nonionic paste of 100% polyalkylene glycol ether. The carrier/diluent is a refined xylene with a high flash point.

An 80% wettable powder (80 WP) formulation of atrazine was used. A typical 80 WP formulation is the following:

| | % wt/wt |
|---|---|
| Atrazine (technical) | 80.00 |
| Base | 20.00 |
| 96.00% carrier/diluent | |
| 2.00% wetting/dispersing agent | |
| 2.00% dispersing agent | |

The wetting/dispersing agent is powdered sodium alkylnaphthalene sulfonate. The dispersing agent is highly purified sodium lignosulfonate. The carrier/diluent is kaolin clay.

A. Improved Tolerance of Crops to Clomazone by Safening

Seeds of field corn (Zea mays) were treated with 1,8-naphthalic anhydride in the following manner.

An appropriate amount of tap water was placed in a low-shear, three-paddled mixer and, with mixing, an amount of the sticker sodium carboxyl methyl cellulose to provide a 2% (wt/wt) solution was added slowly to avoid the formation of agglomerates. The appropriate amount of field corn seeds needed for the test were placed in a clean rotating drum mixer, and the required amount of the aqueous sticker solution to provide a 2% (wt/wt) application of the sticker to the seeds was slowly added. The seed-sticker combination was rotated until the seeds were thoroughly wetted. Aliquots of the seed-sticker combination were then rotated with the required amounts of 1,8-naphthalic anhydride to provide concentrations of 0.5, 1.0, and 1.5% (wt/wt). The process was repeated with seeds of sweet corn, sorghum (*Sorghum vulgare*), barley (*Hordeum vulgare*), spring and winter wheat (*Triticum aestivum*), oats (*Avena sativa*), cotton (*Gossypium hirsutum*), lima beans (*Phaseolus lunatus*), and the weeds morningglory (*Ipomoea spp*), and wild cane (*Saccharum spontaneum*).

Clomazone was tested with the seeds as treated above and with untreated seeds in a standard preemergence herbicidal evaluation as follows.

Two disposable fiber flats (8 cm×15 cm×25 cm) for each rate of application of clomazone were filled to an approximate depth of 6.5 cm with a steam-pasteurized sterilized sandy loam soil. The soil was leveled and impressed with a template that provided eight evenly spaced furrows in each flat that were 13 cm long and 0.5 cm deep. The treated seeds of the appropriate test plant species were planted in the furrows of the flats. The eight row template was again employed to firmly press the seeds into place. A topping soil prepared by mixing equal portions of sand and sandy loam soil was placed uniformly on top of each flat to a depth of approximately 0.5 cm.

In the standard preemergence herbicidal evaluation clomazone was tested as solutions of 1:1 water:acetone. The test solutions were prepared by dissolving the appropriate amount of technical clomazone in the 1:1 acetone:water solvent to give a solution of the highest rate of application needed for the test. Aliquots of this solution were serial diluted with 1:1 acetone:water to provide solutions of the lower rates of application. The test solutions of clomazone were sprayed onto the surface of the soil in the disposable fiber flats to provide rates of application of 2.0 kg/ha and submultiples thereof to 0.0625 kg/ha. The low rate of application was sprayed first so as not to contaminate the spray equipment. Flats of seeds not treated with 1,8-naphthalic anhydride were also sprayed in an identical manner. In addition, flats of seeds treated with 1,8-naphthalic anhydride and not sprayed with clomazone were also included in the tests. The treated and untreated flats were placed in a greenhouse where they were watered regularly at the soil surface for a period of 21 days. At this time the phytotoxicity of clomazone to the plants from the treated and untreated seeds was recorded. Individual plant species were examined for percent kill and a vigor rating of 1 to 5 was assigned to the surviving plants, a vigor rating of 5 signifying no chemical injury. An injury rating using the percent kill and the vigor rating for each plant species in the tests was calculated using the formula set forth in the footnotes to Table 1 (appended).

Utilizing the injury ratings calculated, the increased tolerance of the test plants from seeds safened with 1,8-naphthalic anhydride as compared to the test plants from unsafened seeds was calculated in terms of percent reduction of injury using the formula set forth in the footnotes to Table 1 (appended).

Two tests were conducted to ascertain the tolerance to clomazone of certain plant species grown from seeds safened with 1,8-naphthalic anhydride using the methods described above.

In test 1, clomazone was applied at rates of 2.0 kg/ha, 1.0 kg/ha, 0.5 kg/ha and 0.25 kg/ha in a preemergence manner to soil containing the seeds of sweet and field corn, sorghum, barley, wheat, oats, cotton and lima beans both untreated and treated with 0.5% (wt/wt) and 1.0% 1,8-naphthalic anhydride. The test results (Table 1 appended) show that tolerance of both field and sweet corn to clomazone was increased at all rates of application of clomazone and at both concentrations of 1,8-naphthalic anhydride applied to the seeds. The best tolerance of corn to clomazone appeared to be at the application rates of 0.25–1.0 kg/ha to seeds treated with 1.0% (wt/wt) 1,8-naphthalic anhydride. Injury to the corn under these conditions was reduced by 52 to 100% (100% being completely tolerant).

The tolerance of wheat, barley, and sorghum to clomazone was increased when the seeds were treated with both 0.5% and 1.0% 1,8-naphthalic anhydride. However, the improved tolerance occurred only at the lowest application rate of clomazone (0.25 kg/ha).

The tolerance of oats, cotton, and lima beans to clomazone was least affected by treatment of their seeds with 1,8-naphthalic anhydride.

In test 2, clomazone was applied at rates of 2.0 kg/ha, 1.0 kg/ha, 0.5 kg/ha, 0.25 kg/ha, 0.125 kg/ha and 0.0625 kg/ha in a preemergence manner to soil containing the seeds of field and sweet corn, sorghum, barley, spring and winter wheat, morningglory, and wild cane untreated and treated with 0.5% (wt./wt), 1.0%, and 1.5% 1,8-naphthalic anhydride. The test results (Table 2 appended) show that tolerance of both field and sweet corn to clomazone was increased at all rates of application of clomazone and at all concentrations of 1,8-naphthalic anhydride applied to the seeds. The best tolerance of corn to clomazone appeared to be at the application rates of 0.0625–0.5 kg/ha regardless of the concentration of 1,8-naphthalic anhydride applied to the seeds. Injury to the corn was reduced 100% at the clomazone application rates of 0.0625 kg/ha and 0.125 kg/ha on seeds treated with either 0.5%, 1.0% or 1.5% 1,8-naphthalic anhydride.

Tolerance of winter and spring wheat to clomazone was improved by the seed treatments, but not to the extent of the improvement in the tolerance of corn.

There was no evidence of phytotoxicity to the seeds or plants grown from these seeds when 1,8-naphthalic anhydride was used as a seed treatment.

B. Reduced clomazone Rate by Combined Herbicide Treatment of Safened and Unsafened Corn Clomazone was tested at application rates of 0, 0.01, 0.04, 0.08, and 0.32 kg/ha alone and in combination with atrazine at application rates of 0, 0.04, 0.15, 0.3, and 1.2 kg/ha on corn whose seeds were optionally treated with 1,8-naphthalic anhydride. The corn seed for the portion of the test requiring treatment with 1,8-naphthalic anhydride was processed in the following manner:

Seeds, 200 grams each, of two commercial corn hybrids, Funks* 4522 and Pioneer ®3732, were placed in 32 oz wide-mouth, screw-lid glass jars. Into each glass jar was also placed 1.0 gram of technical grade 1,8-naphthalic anhydride. The lids were placed on each jar and the jars were rolled on their sides at 160 rpm for 20 minutes on a machine with rubber rollers. The resultant seeds were uniformly coated with 0.5% (wt/wt) 1,8-naphthalic anhydride.

A series of stock solutions containing clomazone or atrazine were prepared in the following manner:

From a clomazone 4 EC formulation 7.6 grams was dissolved with mixing in 160 mL of distilled water. An 80 mL aliquot of this solution was removed and set aside for use as the 0.32 kg/ha rate of application of clomazone. The remaining 80 mL aliquot was diluted with an additional 80 mL of water. The 160 mL solution was mixed and divided into two 80 mL aliquots. One 80 mL aliquot was discarded since the 0.16 kg/ha rate was not used in this test. The remaining 80 mL aliquot was diluted as described above to provide solutions for the 0.08 and the 0.04 kg/ha rate of application of clomazone. One additional solution was prepared by dissolving 0.239 gram of the formulation of clomazone as described above in 160 mL of water to provide the 0.01 kg/ha rate of application of clomazone.

From an atrazine 80 WP formulation a solution for a 1.2 kg/ha rate of application was prepared by dissolving 17.09 grams of the formulated material in 160 mL of distilled water. The solutions for the 0.3, 0.15, and the 0.04 kg/ha rates of application of atrazine were prepared by dissolving 4.27 grams of the formulated atrazine in 160 mL of distilled water. The solution was divided into two 80 mL aliquots and serially diluted as described above.

The appropriate test solutions as described above were used to prepare spray solutions for the chemical application. Thus, 4.0 mL of each of the clomazone solutions or 4.0 mL of each of the atrazine solutions were pipetted into Erlenmeyer flasks. The volume of each was brought to 80 mL by the addition of distilled water to provide the spray solutions of clomazone or atrazine at the rates of application described. The spray solutions for the combination tests of clomazone and atrazine were also prepared in the same manner; that is by combining 4.0 mL of the appropriate clomazone test solution with 4.0 mL of the appropriate atrazine solution and diluting to 80 mL with distilled water.

To establish the herbicide test, plastic flats (36 cm×13 cm×6.5 cm) were filled to an approximate depth of 4.0 cm with a steam-pasteurized loam soil, and the soil was leveled in the flats. A moving belt spray machine was calibrated to deliver at the rate of 30 gallons of spray solution per acre, at a spray pressure of 43 PSI through a nozzle delivering a fine spray. Into this spray machine were placed six of the above flats of soil. The spray reservoir was filled with one of the 80 mL spray solutions prepared above. The spray machine applied the spray solution to the surface of the soil in the flats and then delivered the flats to a chamber where the solvent evaporated. This process was repeated until all the spray solutions had been applied to a group of six flats of soil.

The groups of six flats that had been treated with one spray solution were dumped together into a five gallon metal can that was mounted at an angle on a rotating base and which contained a stationary paddle. The soil was thoroughly mixed by rotating the metal can for three minutes. Six 250 mL beakers of soil were removed and set aside for later use in covering the seeds. The remaining soil was evenly divided and placed back into the six original flats.

The soil in the flats was leveled and pressed with a template that provided eight evenly spaced furrows in the flat that were 10 cm long and about 0.5 cm deep. Seeds of the following species were placed in this order in the respective furrows, with the corn being either treated or untreated with 1,8-naphthalic anhydride as described above: field corn (*Zea mays*) Funk's hybrid 4522, field corn (*Zea mays*) Pioneer hybrid 3732, pigweed (*Amaranthus retroflexus*), velvetleaf (*Abutilon theophrasti*), lambsquarter (*Chenopodium album*), crabgrass (*Digitaria sanguinalis*), green foxtail (*Setaria viridis*) and barnyardgrass (*Echinochloa crusgalli*). The eight row template was used again to press the seeds firmly into the soil at the bottom of the furrow. The soil which had been set aside after the soil mixing operation was now used to cover the seeds in the flats. Care was taken to match the topping soil with the flats that contained the same herbicide treatment from which that soil had been removed. One 250 mL beaker of soil was spread over each flat, leveled and pressed firmly down.

The flats were divided into three sets of replicate treatments, and placed in the greenhouse grouped by replicate and arranged within those groupings according to a series of randomly generated numbers. At that time the flats were thoroughly watered from the top and were subsequently surface watered three times per day. Two weeks after planting, phytotoxicity of each of the herbicide combinations was evaluated separately for each species by a visual judgement of percent kill.

The test results are set forth in Tables 3 and 3A (appended), from which it is readily apparent that the tolerance of corn to clomazone, at rates of application of clomazone that would otherwise be damaging, can be greatly increased by the treatment of the corn seeds with 1,8-naphthalic anhydride. For example, at an application rate of 0.32 kg/ha of clomazone, the injury to corn was reduced by 74% when the corn seeds were treated with 0.5% (wt/wt) of 1,8-naphthalic anhydride.

Readily apparent, also, is that when clomazone is applied in combination with atrazine a better, broader spectrum of weed control in corn plots is realized than when either of the two herbicides are applied alone. For example, at an application rate of 0.08 kg/ha, clomazone alone controls 64% and 75% of the broadleaf and grass weed species, respectively. At an application rate of 0.04 kg/ha, atrazine alone controls 24% and 8% of the broadleaf and grass weed species, respectively. However, when a combination of clomazone and atrazine (each at the same rates of application as the individual applications) was applied, the control of broadleaf weed species was increased to 81% and the control of grass weed species was increased to 92%.

The synergism of this effect was verified by subjecting the weed injury data to analysis by Limpel's formula as set forth in the footnote to Table 4. Limpel's formula is discussed in "Weed Control Dimethylchloroterephthalate Alone and In Certain Combinations," Limpel et al, Proc. *NEWCC*, 16, 48–53 (1962).

When the observed weed injury exceeds the weed injury which would have been expected using Limpel's formula, synergism is demonstrated. Thus, at an application rate of 0.08 kg/ha of clomazone in combination with 0.15 kg/ha of atrazine, Limpel's formula would predict 73% mean broadleaf weed injury and 77% mean grass weed injury. In reality the combination of clomazone and atrazine at the aforementioned rates of application caused 81% mean broadleaf weed injury and 92% mean grass weed injury. As shown in Table 4 (appended) combinations of clomazone and atrazine at other rates of application are also synergistic when subjected to Limpel's formula.

The synergistic effect as evidenced above allows lower rates of application of a combination of clomazone and atrazine than would be equally efficacious if these two herbicides were used individually.

TABLE 1

Increased Tolerance of Crops to Clomazone Using Seeds Treated with 1,8-Naphthalic Anhydride (NA)
Test 1

| Crop Species | Rate of Application of Clomazone | Injury* to crops grown from seeds treated with 0.5% (wt/wt) and 1.0% (wt/wt) NA | | Injury* to crops grown from seeds not treated with NA | Percent Reduction of Injury* to crops grown from seeds treated with NA as compared to crops grown from seeds not treated | |
|---|---|---|---|---|---|---|
| | | 0.5% | 1.0% | | 0.5% | 1.0% |
| Field corn | 0.25 kg/ha | 12 | 0 | 63 | 81 | 100 |
| Sweet corn | | 0 | 0 | 63 | 100 | 100 |
| Sorghum | | 55 | 12 | 93 | 41 | 87 |
| Barley | | 12 | 12 | 48 | 75 | 75 |
| Wheat | | 48 | 12 | 96 | 50 | 88 |
| Oats | | 30 | 12 | 12 | 0 | 0 |
| Cotton | | 12 | 12 | 12 | 0 | 0 |
| Lima beans | | 12 | 100 | 0 | 0 | 0 |
| Field corn | 0.5 kg/ha | 12 | 12 | 100 | 88 | 88 |
| Sweet corn | | 12 | 12 | 99 | 88 | 88 |
| Sorghum | | 100 | 98 | 100 | 0 | 2 |
| Barley | | 99 | 89 | 95 | 0 | 6 |
| Wheat | | 99 | 100 | 100 | 1 | 0 |
| Oats | | 78 | 48 | 78 | 0 | 38 |
| Cotton | | 21 | 99 | 99 | 79 | 0 |
| Lima beans | | 12 | 63 | 12 | 0 | 0 |
| Field corn | 1.0 kg/ha | 25 | 12 | 100 | 75 | 88 |
| Sweet corn | | 48 | 12 | 100 | 52 | 88 |
| Sorghum | | 100 | 100 | 100 | 0 | 0 |
| Barley | | 100 | 99 | 100 | 0 | 1 |
| Wheat | | 100 | 100 | 100 | 0 | 0 |
| Oats | | 100 | 99 | 100 | 0 | 1 |
| Cotton | | 100 | 100 | 100 | 0 | 0 |
| Lima beans | | 12 | 100 | 70 | 83 | 0 |
| Field corn | 2.0 kg/ha | 90 | 78 | 100 | 10 | 12 |
| Sweet corn | | 90 | 85 | 100 | 10 | 15 |
| Sproghum | | 100 | 100 | 100 | 0 | 0 |
| Barley | | 100 | 100 | 100 | 0 | 0 |
| Wheat | | 100 | 100 | 100 | 0 | 0 |
| Oats | | 100 | 100 | 100 | 0 | 0 |
| Cotton | | 100 | 100 | 100 | 0 | 0 |

TABLE 1-continued

Increased Tolerance of Crops to Clomazone Using Seeds Treated with 1,8-Naphthalic Anhydride (NA)

Test 1

| Crop Species | Rate of Application of Clomazone | Injury* to crops grown from seeds treated with 0.5% (wt/wt) and 1.0% (wt/wt) NA | | Injury* to crops grown from seeds not treated with NA | Percent Reduction of Injury* to crops grown from seeds treated with NA as compared to crops grown from seeds not treated | |
|---|---|---|---|---|---|---|
| | | 0.5% | 1.0% | | 0.5% | 1.0% |
| Lima beans | | 95 | 63 | 70 | 0 | 10 |

*Injury = percent kill + X(100 − percent kill)

X = Vigor 1 = 1
Vigor 2 = 0.75
Vigor 3 = 0.25
Vigor 4 = 0.12
Vigor 5 = 0

$$**\text{Percent reduction of injury} = \frac{(\text{Injury to crops from untreated seeds}) - (\text{Injury to crops from treated seeds})}{\text{Injury to crops from untreated seeds}} \times 100$$

TABLE 2

Increased Tolerance of Crops and Weeds to Clomazone Using Seeds Treated with 1,8-Naphthalic Anhydride (NA)

Test 2

| Crop Species | Rate of Application of Clomazone | Injury* to plants grown from seeds treated with 0.5% (wt/wt) 1.0% and 1.5% NA | | | Injury* to plants grown from seeds not treated with NA | Percent Reduction of Injury** to Plants grown from seeds treated with NA as compared to plants grown from seeds seeds not treated | | |
|---|---|---|---|---|---|---|---|---|
| | | 0.5% | 1.0% | 1.5% | | 0.5% | 1.0% | 1.5% |
| Field corn | 0.0625 kg/ha | 0 | 0 | 0 | 40 | 100 | 100 | 100 |
| Sweet corn | | 0 | 0 | 0 | 12 | 100 | 100 | 100 |
| Sorghum | | 12 | 25 | 12 | 12 | 0 | 0 | 0 |
| Barley | | 12 | 25 | 25 | 12 | 0 | 0 | 0 |
| Sp-Wheat | | 12 | 12 | 12 | 25 | 52 | 52 | 52 |
| W-Wheat | | 12 | 12 | 12 | 25 | 52 | 52 | 52 |
| Morningglory | | 12 | 25 | 12 | 12 | 0 | 0 | 0 |
| Wild cane | | 0 | 12 | 12 | 12 | 100 | 0 | 0 |
| Field corn | 0.125 kg/ha | 0 | 0 | 0 | 70 | 100 | 100 | 100 |
| Sweet corn | | 0 | 0 | 0 | 38 | 100 | 100 | 100 |
| Sorghum | | 25 | 12 | 48 | 93 | 73 | 87 | 48 |
| Barley | | 78 | 78 | 78 | 48 | 0 | 0 | 0 |
| Sp-Wheat | | 48 | 55 | 70 | 70 | 31 | 21 | 0 |
| W-Wheat | | 48 | 25 | 55 | 78 | 38 | 68 | 29 |
| Morningglory | | 12 | 85 | 12 | 12 | 0 | 0 | 0 |
| Wild cane | | 12 | 12 | 38 | 25 | 52 | 53 | 0 |
| Field corn | 0.250 kg/ha | 12 | 12 | 0 | 100 | 88 | 88 | 100 |
| Sweet corn | | 12 | 12 | 12 | 83 | 86 | 86 | 86 |
| Sorghum | | 98 | 55 | 63 | 100 | 2 | 45 | 37 |
| Barley | | 85 | 85 | 85 | 85 | 0 | 0 | 0 |
| Sp-Wheat | | 85 | 85 | 55 | 99 | 14 | 14 | 44 |
| W-Wheat | | 85 | 85 | 55 | 99 | 14 | 14 | 44 |
| Morningglory | | 12 | 55 | 85 | 12 | 0 | 0 | 0 |
| Wild cane | | 12 | 70 | 55 | 99 | 88 | 20 | 44 |
| Field corn | 0.5 kg/ha | 12 | 12 | 12 | 100 | 88 | 88 | 88 |
| Sweet corn | | 12 | 12 | 12 | 83 | 86 | 86 | 86 |
| Sorghum | | 98 | 98 | 100 | 100 | 2 | 2 | 0 |
| Barley | | 100 | 100 | 98 | 85 | 0 | 0 | 0 |
| Sp-Wheat | | 85 | 85 | 98 | 99 | 14 | 14 | 1 |
| W-Wheat | | 70 | 85 | 98 | 99 | 29 | 14 | 1 |
| Morningglory | | 56 | 47 | 85 | 70 | 20 | 33 | 0 |
| Wild cane | | 25 | 100 | 98 | 100 | 0 | 2 | 0 |
| Field corn | 1.0 kg/ha | 65 | 25 | 25 | 100 | 35 | 75 | 75 |
| Sweet corn | | 38 | 25 | 48 | 100 | 62 | 75 | 52 |
| Sorghum | | 99 | 100 | 100 | 100 | 1 | 0 | 0 |
| Barley | | 98 | 100 | 100 | 100 | 2 | 0 | 0 |
| Sp-Wheat | | 98 | 98 | 100 | 100 | 2 | 0 | 0 |
| W-Wheat | | 100 | 100 | 100 | 100 | 0 | 0 | 0 |
| Morningglory | | 65 | 78 | 85 | 99 | 34 | 21 | 14 |
| Wild cane | | 99 | 100 | 100 | 100 | 1 | 0 | 0 |
| Field corn | 2.0 kg/ha | 88 | 90 | 90 | 100 | 12 | 10 | 10 |
| Sweet corn | | 95 | 100 | 100 | 100 | 5 | 0 | 0 |
| Sorghum | | 100 | 100 | 100 | 100 | 0 | 0 | 0 |
| Barley | | 100 | 100 | 100 | 100 | 0 | 0 | 0 |
| Sp-Wheat | | 100 | 100 | 100 | 100 | 0 | 0 | 0 |
| W-Wheat | | 100 | 100 | 100 | 100 | 0 | 0 | 0 |

TABLE 2-continued

Increased Tolerance of Crops and Weeds to Clomazone Using Seeds Treated with 1,8-Naphthalic Anhydride (NA)

Test 2

| Crop Species | Rate of Application of Clomazone | Injury* to plants grown from seeds treated with 0.5% (wt/wt) 1.0% and 1.5% NA 0.5% | 1.0% | 1.5% | Injury* to plants grown from seeds not treated with NA | Percent Reduction of Injury** to Plants grown from seeds treated with NA as compared to plants grown from seeds seeds not treated 0.5% | 1.0% | 1.5% |
|---|---|---|---|---|---|---|---|---|
| Morningglory | | 70 | 99 | 99 | 100 | 30 | 1 | 1 |
| Wild cane | | 98 | 100 | 100 | 100 | 2 | 0 | 0 |

*Injury - same as Table 1
**Percent reduction of injury - same as Table 1

TABLE 3

Efficacy of Clomazone in Combination with Atrazine on Corn Using Seed Treated with 1,8-Naphthalic Anhydride (NA) and Untreated Seeds

| Rate of Appln. of Clomazone | Rate of Appln. of Atrazine | Corn Seeds Treated with 0.5% NA No | Yes | Percent Kill: Corn[1] Funks G4522 | Pioneer 3732 | Pigweed[2] | Velvet-Leaf | Lambs-quarter | Crab-grass | Green Fox-tail | Barn-yard-Grass |
|---|---|---|---|---|---|---|---|---|---|---|---|
| 0 kg/ha | 0 kg/ha | X | | 0 | 0 | 0 | 1 | 0 | 0 | 0 | 0 |
| | | | X | 0 | 0 | | | | | | |
| 0.01 | 0 | X | | 0 | 0 | 1 | 38 | 0 | 35 | 19 | 19 |
| | | | X | 0 | 0 | | | | | | |
| 0.04 | 0 | X | | 15 | 0 | 46 | 74 | 37 | 66 | 67 | 69 |
| | | | X | 11 | 0 | | | | | | |
| 0.08 | 0 | X | | 91 | 6 | 46 | 89 | 58 | 69 | 67 | 88 |
| | | | X | 3 | 2 | | | | | | |
| 0.32 | 0 | X | | 99 | 98 | 57 | 98 | 96 | 90 | 92 | 98 |
| | | | X | 35 | 16 | | | | | | |
| 0 | 0.04 | X | | 0 | 0 | 8 | 59 | 4 | 12 | 7 | 7 |
| | | | X | 0 | 0 | | | | | | |
| 0 | 0.15 | X | | 0 | 0 | 13 | 38 | 90 | 79 | 63 | 82 |
| | | | X | 0 | 0 | | | | | | |
| 0 | 0.3 | X | | 0 | 0 | 100 | 94 | 97 | 85 | 70 | 84 |
| | | | X | 0 | 0 | | | | | | |
| 0 | 1.2 | X | | 0 | 0 | 97 | 99 | 99 | 98 | 93 | 95 |
| | | | X | 0 | 0 | | | | | | |
| 0.01 | 0.04 | X | | 0 | 0 | 4 | 72 | 9 | 50 | 27 | 33 |
| | | | X | 0 | 0 | | | | | | |
| 0.01 | 0.15 | X | | 0 | 0 | 79 | 87 | 93 | 82 | 66 | 68 |
| | | | X | 0 | 0 | | | | | | |
| 0.01 | 0.3 | X | | 0 | 0 | 94 | 99 | 100 | 93 | 77 | 83 |
| | | | X | 0 | 0 | | | | | | |
| 0.01 | 0.2 | X | | 0 | 0 | 100 | 99 | 100 | 98 | 95 | 97 |
| | | | X | 0 | 0 | | | | | | |
| 0.04 | 0.04 | X | | 2 | 0 | 8 | 72 | 16 | 82 | 75 | 79 |
| | | | X | 0 | 0 | | | | | | |
| 0.04 | 0.15 | X | | 2 | 0 | 74 | 99 | 95 | 90 | 78 | 84 |
| | | | X | 0 | 0 | | | | | | |
| 0.04 | 0.3 | X | | 42 | 24 | 99 | 100 | 99 | 93 | 89 | 95 |
| | | | X | 3 | 2 | | | | | | |
| 0.04 | 1.2 | X | | 20 | 2 | 89 | 99 | 100 | 99 | 97 | 98 |
| | | | X | 0 | 0 | | | | | | |
| 0.08 | 0.04 | X | | 50 | 5 | 55 | 89 | 99 | 95 | 88 | 92 |
| | | | X | 0 | 0 | | | | | | |
| 0.08 | 0.15 | X | | 83 | 5 | 99 | 100 | 100 | 97 | 92 | 90 |
| | | | X | 1 | 0 | | | | | | |
| 0.08 | 0.3 | X | | 48 | 3 | 98 | 99 | 100 | 95 | 87 | 93 |
| | | | X | 0 | 0 | | | | | | |
| 0.08 | 1.2 | X | | 87 | 37 | 100 | 100 | 99 | 97 | 99 | 98 |
| | | | X | 2 | 0 | | | | | | |
| 0.32 | 0.4 | X | | 100 | 100 | 100 | 100 | 100 | 100 | 100 | 100 |
| | | | X | 84 | 50 | | | | | | |
| 0.32 | 0.15 | X | | 99 | 94 | 100 | 100 | 100 | 100 | 100 | 100 |
| | | | X | 53 | 50 | | | | | | |
| 0.32 | 0.3 | X | | 99 | 98 | 98 | 100 | 100 | 100 | 100 | 100 |
| | | | X | 50 | 33 | | | | | | |
| 0.32 | 1.2 | X | | 99 | 98 | 100 | 100 | 100 | 100 | 100 | 100 |
| | | | X | 23 | 8 | | | | | | |

[1]The percent kill of corn is derived from the average of three replicates.
[2]The percent kill of the weed species is derived from the average of six replicates, three from flats containing corn seeds treated with NA and three from flats containing corn seeds not treated with NA.

TABLE 3A

Summary of Efficacy of Clomazone in Combination with Atrazine on Corn Using Seeds Treated with 1,8-Naphthalic Anhydride (NA) And Untreated Seeds

| Rate of Application of Clomazone | Rate of Application of Atrazine | Corn Seeds Treated with 0.5% NA | | Percent Kill | | |
|---|---|---|---|---|---|---|
| | | No | Yes | Mean Corn[1] Injury | Mean Broadleaf[2] Weed Injury | Mean Grass[3] Weed Injury |
| 0 kg/ha | 0 kg/ha | X | | 0 | 0 | 0 |
| | | | X | 0 | | |
| 0.01 | 0 | X | | 0 | 13 | 24 |
| | | | X | 0 | | |
| 0.04 | 0 | X | | 8 | 52 | 67 |
| | | | X | 0 | | |
| 0.08 | 0 | X | | 49 | 64 | 75 |
| | | | X | 2 | | |
| 0.32 | 0 | X | | 99 | 83 | 93 |
| | | | X | 26 | | |
| 0 | 0.04 | X | | 0 | 24 | 8 |
| | | | X | 0 | | |
| 0 | 0.15 | X | | 0 | 47 | 75 |
| | | | X | 0 | | |
| 0 | 0.3 | X | | 0 | 97 | 80 |
| | | | X | 0 | | |
| 0 | 1.2 | X | | 0 | 98 | 95 |
| | | | X | 0 | | |
| 0.01 | 0.04 | X | | 0 | 29 | 36 |
| | | | X | 0 | | |
| 0.01 | 0.15 | X | | 0 | 86 | 72 |
| | | | X | 0 | | |
| 0.01 | 0.3 | X | | 0 | 98 | 84 |
| | | | X | 0 | | |
| 0.01 | 1.2 | X | | 0 | 99 | 97 |
| | | | X | 0 | | |
| 0.04 | 0.04 | X | | 1 | 32 | 79 |
| | | | X | 0 | | |
| 0.04 | 0.15 | X | | 1 | 89 | 84 |
| | | | X | 0 | | |
| 0.04 | 0.3 | X | | 24 | 99 | 92 |
| | | | X | 2 | | |
| 0.04 | 1.2 | X | | 11 | 96 | 98 |
| | | | X | 0 | | |
| 0.08 | 0.04 | X | | 28 | 81 | 92 |
| | | | X | 0 | | |
| 0.08 | 0.15 | X | | 44 | 100 | 93 |
| | | | X | 1 | | |
| 0.08 | 0.3 | X | | 26 | 99 | 92 |
| | | | X | 0 | | |
| 0.08 | 1.2 | X | | 62 | 100 | 98 |
| | | | X | 1 | | |
| 0.32 | 0.04 | X | | 100 | 100 | 100 |
| | | | X | 67 | | |
| 0.32 | 0.15 | X | | 97 | 100 | 100 |
| | | | X | 52 | | |
| 0.32 | 0.3 | X | | 99 | 99 | 100 |
| | | | X | 42 | | |
| 0.32 | 1.2 | X | | 99 | 100 | 100 |
| | | | X | 16 | | |

[1]The mean corn injury is the average of the percent kill of both varieties of corn from Table 3.
[2]The mean broadleaf weed injury is the average of the percent kill of the pigweed, velvetleaf, and lambsquarter from Table 3.
[3]The mean grass weed injury is the average of the percent kill of the crabgrass, green foxtail, and the barnyardgrass from Table 3.

TABLE 4

Synergistic Herbicidal Activity From Combinations of Clomazone with Atrazine

| Rate of Appl'n of Clomazone | Rate of Appl'n of Atrazine | Percent Kill: Mean Broadleaf Weed Injury O[1] | Mean Broadleaf Weed Injury E[2] | Mean Grass Weed Injury O[1] | Mean Grass Weed Injury E[2] |
|---|---|---|---|---|---|
| 0.01 kg/ha | 0 kg/ha | 13 | | 24 | |
| 0 | 0.04 | 24 | | 8 | |
| 0.01 | 0.04 | 29 | 34 | 36* | 30 |
| 0.01 | 0 | 13 | 24 | | |
| 0 | 0.15 | 47 | 75 | | |
| 0.01 | 0.15 | 86* | 54 | 72 | 81 |
| 0.01 | 0 | 13 | | 24 | |
| 0 | 0.3 | 97 | | 80 | |
| 0.01 | 0.3 | 98 | 97 | 84 | 95 |
| 0.01 | 0 | 13 | | 24 | |

TABLE 4-continued

Synergistic Herbicidal Activity From Combinations of Clomazone with Atrazine

| Rate of Appl'n of Clomazone | Rate of Appl'n of Atrazine | Percent Kill: Mean Broadleaf Weed Injury O[1] | Mean Broadleaf Weed Injury E[2] | Mean Grass Weed Injury O[1] | Mean Grass Weed Injury E[2] |
|---|---|---|---|---|---|
| 0 | 1.2 | 98 | | 95 | |
| 0.01 | 1.2 | 99 | 98 | 97 | 96 |
| 0.04 | 0 | 52 | | 67 | |
| 0 | 0.04 | 24 | | 8 | |
| 0.04 | 0.04 | 32 | 64 | 79* | 70 |
| 0.04 | 0 | 52 | | 67 | |
| 0 | 0.15 | 47 | | 75 | |
| 0.04 | 0.15 | 89* | 79 | 84 | 92 |
| 0.4 | 0 | 52 | | 67 | |
| 0 | 0.3 | 97 | | 80 | |

TABLE 4-continued

Synergistic Herbicidal Activity From Combinations of Clomazone with Atrazine

| Rate of Appl'n of Clomazone | Rate of Appl'n of Atrazine | Percent Kill: Mean Broadleaf Weed Injury O[1] | Mean Broadleaf Weed Injury E[2] | Mean Grass Weed Injury O[1] | Mean Grass Weed Injury E[2] |
|---|---|---|---|---|---|
| 0.04 | 0.3 | 99 | 99 | 92 | 93 |
| 0.04 | 0 | 52 | | 67 | |
| 0 | 1.2 | 98 | | 95 | |
| 0.04 | 1.2 | 96 | 99 | 98 | 98 |
| 0.08 | 0 | 64 | | 75 | |
| 0 | 0.04 | 24 | | 8 | |
| 0.08 | 0.04 | 81* | 73 | 92* | 77 |
| 0.08 | 0 | 64 | | 75 | |
| 0 | 0.15 | 47 | | 75 | |
| 0.08 | 0.15 | 100* | 81 | 93 | 94 |
| 0.08 | 0 | 64 | | 75 | |
| 0 | 0.3 | 97 | | 80 | |
| 0.08 | 0.3 | 99 | 99 | 92 | 95 |
| 0.08 | 0 | 64 | | 75 | |
| 0 | 1.2 | 98 | | 95 | |
| 0.08 | 1.2 | 100 | 99 | 98 | 99 |
| 0.32 | 0 | 83 | | 93 | |
| 0 | 0.04 | 24 | | 8 | |
| 0.32 | 0.04 | 100* | 87 | 100* | 94 |
| 0.32 | 0 | 83 | | 93 | |
| 0 | 0.15 | 47 | | 75 | |
| 0.32 | 0.15 | 100* | 91 | 100 | 98 |
| 0.32 | 0 | 83 | | 93 | |
| 0 | 0.3 | 97 | | 80 | |

TABLE 4-continued

Synergistic Herbicidal Activity From Combinations of Clomazone with Atrazine

| Rate of Appl'n of Clomazone | Rate of Appl'n of Atrazine | Percent Kill: Mean Broadleaf Weed Injury O[1] | Mean Broadleaf Weed Injury E[2] | Mean Grass Weed Injury O[1] | Mean Grass Weed Injury E[2] |
|---|---|---|---|---|---|
| 0.32 | 0.3 | 99 | | 100 | 99 |
| 0.32 | 0 | 83 | | 93 | |
| 0 | 1.2 | 98 | | 95 | |
| 0.32 | 1.2 | 100 | 100 | 100 | 100 |

[1]O is the observed mean broadleaf and mean grass injury data from Table 3A

[2]E is the expected results for combinations of clomazone and atrazine based on the response for each herbicide alone derived from Limpel's formula, namely:

$$E = (X + Y) - \frac{XY}{100}$$

where X is the observed mean injury when one the the herbicides is used alone. Y is the observed mean injury when the other herbicide is used alone

*When the observed results exceed the result which would have been expected, synergism is demonstrated.

We claim:

1. A method of controlling undesirable vegetation in the locus of a gramineous crop while minimizing injury to the crop, which comprises applying, to seed of the crop or the locus thereof an antidotally effective amount of a safener against injury from the clomazone, and applying to the locus of the crop a herbicidally effective amount of clomazone.

2. The method of claim 1 wherein the crop is corn.

3. The method of claim 1 wherein the safener is 1 8-naphthalic anhydride.

4. The method of claim 1 wherein the safener is 1,8-naphthalic anhydride and the safener is applied to seed of the crop.

5. The method of claim 4 wherein the crop is corn.

* * * * *